(12) United States Patent
Smasne

(10) Patent No.: US 6,511,269 B1
(45) Date of Patent: Jan. 28, 2003

(54) APPARATUS AND METHOD FOR LOCATING AN OBJECT BEHIND A PANEL AND CUTTING AN APERTURE IN THE PANEL TO REVEAL THE OBJECT

(76) Inventor: Kathrine R. Smasne, P.O. Box 1013, Irrigon, OR (US) 97844-1013

( * ) Notice: Subject to any disclaimer, the term of this patent is extended or adjusted under 35 U.S.C. 154(b) by 0 days.

(21) Appl. No.: 09/517,470

(22) Filed: Mar. 2, 2000

(51) Int. Cl.[7] .............................. B23C 3/26; B23C 1/20; B26F 1/00
(52) U.S. Cl. .................. 409/132; 144/371; 33/528; 33/DIG. 10
(58) Field of Search ..................... 33/528, DIG. 10, 33/562, 370, 371; 144/144.51, 371; 409/131–132, 130, 84

(56) References Cited

U.S. PATENT DOCUMENTS

| | | | | |
|---|---|---|---|---|
| 2,775,812 A | * | 1/1957 | Mohr | 33/528 |
| 2,898,688 A | * | 8/1959 | Cottar | 33/528 |
| 3,057,053 A | * | 10/1962 | Schlage et al. | 29/407.1 |
| 3,253,730 A | * | 5/1966 | Mount | 220/3.4 |
| 3,888,013 A | * | 6/1975 | Benoit | 33/DIG. 10 |
| 3,924,331 A | * | 12/1975 | Goosen | 33/DIG. 10 |
| 4,059,905 A | | 11/1977 | Wieting | |
| 4,202,388 A | | 5/1980 | Wieting | |
| 4,259,785 A | | 4/1981 | Wortham | |
| 4,285,135 A | | 8/1981 | Minozzi, Jr. | |
| 4,335,511 A | * | 6/1982 | Bowling | 33/DIG. 10 |
| 4,359,302 A | * | 11/1982 | Payne | 144/144.51 |
| 4,802,284 A | | 2/1989 | Jackson | |
| 5,172,483 A | | 12/1992 | Yocono, Sr. | |
| 5,222,303 A | | 6/1993 | Jardine | |
| 5,615,490 A | | 4/1997 | Burchell | |
| 5,639,991 A | * | 6/1997 | Schuette | 33/528 |
| 6,055,736 A | * | 5/2000 | Gaston | 33/528 |
| D427,927 S | * | 7/2000 | Ross | D10/104 |
| 6,403,883 B1 | * | 6/2002 | Morgan et al. | 33/528 |

* cited by examiner

Primary Examiner—A. L. Wellington
Assistant Examiner—Erica E Cadugan
(74) Attorney, Agent, or Firm—Liebler, Ivey & Connor; Floyd E. Ivey

(57) ABSTRACT

The present invention discloses an apparatus for locating the position of an object behind a panel and protecting the object or any contents therein during the cutting of an aperture in the panel. In particular, the invention discloses an apparatus for locating the position of an electrical outlet or switch box or the like behind a panel and protecting any wires situated in said box during the cutting of an aperture in the panel to reveal said box. The apparatus comprises a base composed of substantially planar front and back surfaces. The edge of said base may extend a distance generally normal to one of said substantially planar front and back surfaces to thereby define a support extension that supports and stabilizes the apparatus when positioned in a box. A locator pin is connected to the base by means, and extends outwardly from the base for piercing the panel. The invention further discloses a method of cutting an aperture in a panel to reveal an electrical outlet or switch box or the like located behind said panel, comprising the steps of inserting the apparatus into the electrical outlet or switch box such that the locator pin extends out of said box a distance at least the width of the panel; and moving the panel into a desired position and causing the locator pin to protrude through the panel, thereby locating the position of the box behind the panel and protecting any contents therein such as any wires during the cutting of the aperture. Prior to cutting the aperture, the locator pin may be removed to facilitate the cutting. An aperture may be accurately cut in the panel to reveal said box, preferably using a router.

3 Claims, 7 Drawing Sheets

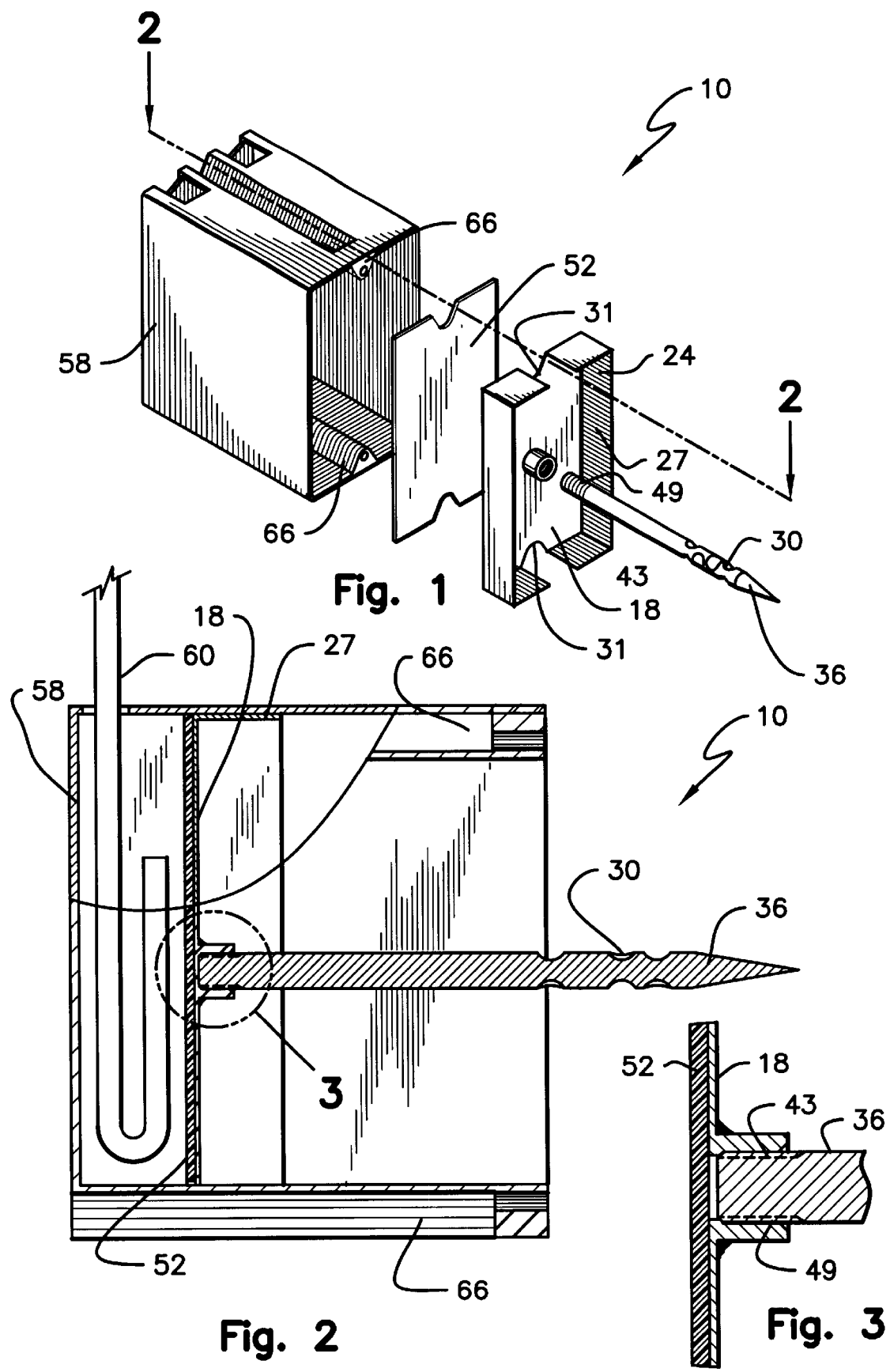

APPARATUS AND METHOD FOR LOCATING AN OBJECT BEHIND A PANEL AND CUTTING AN APERTURE IN THE PANEL TO REVEAL THE OBJECT

FIELD OF THE INVENTION

The present invention relates generally to building construction, and, in particular to an apparatus and method for locating an object behind a panel and cutting an aperture to reveal the object. More in particular, the invention relates to an apparatus and method for locating an electrical outlet or switch box or the like behind a panel and cutting an aperture in the panel to reveal an electrical outlet or switch box or the like while protecting any wires situated in said box.

BACKGROUND OF THE INVENTION

During the construction or remodeling of homes or commercial buildings, boxes for electrical outlets, switches, or the like are installed in a frame. Wires are positioned within the box and a cover member such as a sheetrock or wood panel is then installed in place. Accurately locating the electrical outlet or switch box behind the panel and cutting a hole in the panel to reveal the box requires substantial effort and time and frequently results in errors.

Various methods and apparatuses have been proposed for locating an electrical outlet or switch box during installation of a panel and cutting an opening in the panel to reveal the box. However, these methods and apparatuses do not facilitate the cutting of the access opening nor do they protect any wires situated in the box as contemplated by the present invention. Typically the apparatuses and methods involve the use of templates or cutter guides and may require substantial time and effort to locate the position of the box and cut an opening in the panel. See U.S. Pat. Nos. 4,059,905, 4,202,388, 4,259,785, 4,285,135, 4,802,284, 5,172,483, 5,222,303, 5,615,490.

The patents referred to herein are provided herewith in an Information Disclosure Statement in accordance with 37 CFR 1.97.

SUMMARY OF THE INVENTION

The present invention discloses an apparatus for locating the position of an object behind a panel and protecting said object or any contents therein during the cutting of an aperture in the panel. In particular, the present invention discloses an apparatus for locating the position of an electrical outlet or switch box or the like behind a panel and protecting any wires situated therein during the cutting of an aperture in the panel to reveal the box. "Or the like" means that the invention may be used for any object located behind a panel including but not limited to boxes, conduit such as gas, water, or sewer piping, electrical wiring, fiber optic wiring, and any other article or structure situated behind the panel. The box may be of any type, shape, or size, as recognized by one of ordinary skill in the art, including but not limited to round, square, rectangular, and single and multi-gang sizes. The apparatus comprises a base composed of substantially planar front and back surfaces. The edge of said base may extend a distance generally normal to one of said substantially planar front and back surfaces to thereby define a support extension. The support extension supports and stabilizes the apparatus when positioned in a box. A locator pin is connected to the base by means, and extends outwardly from the base for piercing the panel. The locator pin may be formed integral with the base, the locator pin may be received in an aperture in the base and held by a friction fit, or the apparatus may further comprise female threads located in said base and male threads located on the locator pin to be received into said female threads.

The invention further discloses a method of cutting an aperture in a panel to reveal an electrical outlet or switch box or the like located behind said panel, comprising the steps of inserting the apparatus into the box such that the locator pin extends out of said box a distance at least the width of the panel; and moving the panel into a desired position, causing the locator pin to protrude through the panel, thereby locating the position of said box or the like behind the panel and protecting said box or the like and any contents therein, such as any wires, during the cutting of the aperture.

Prior to cutting the aperture, the locator pin may be removed to facilitate the cutting. If the locator pin has male threads received into the female threads on the base, the locator pin may either be unscrewed from the base or broken at a point along the locator pin. If the locator pin is formed integral with the base, the locator pin may be broken at a point along the locator pin.

An aperture may be accurately cut in the panel to reveal said box using cutting means. The panel may be cut using any cutting device as recognized by one of ordinary skill in the art including but not limited to knives, razors, and saws. It is preferred that the aperture in said panel is cut using a router.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is an exploded isometric view showing the apparatus including a base comprising female threads to receive the male threads on the locator pin. A protective sheet and a single gang outlet or switch box are also shown.

FIG. 2 is an enlarged fragmentary sectional view showing the apparatus positioned in an electrical outlet or switch box and protecting wires situated therein.

FIG. 3 is an enlarged view showing the protective sheet and the locator pin attached to the base.

DETAILED DESCRIPTION OF THE PREFERRED EMBODIMENTS

Figures 4, 5:
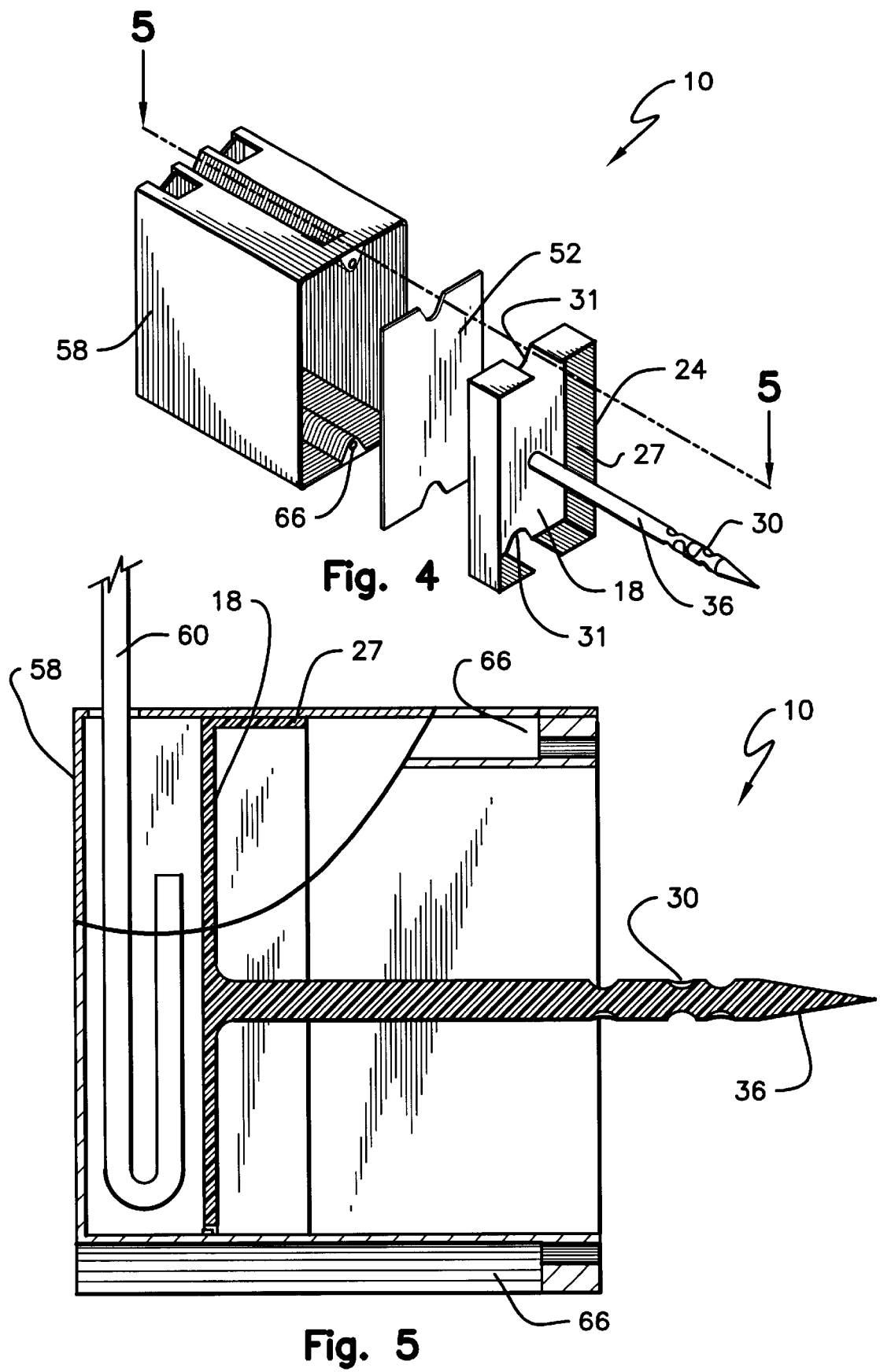
FIG. 4 is an exploded isometric view showing the apparatus, a protective sheet, and a single gang outlet box. The locator pin is shown formed integral to the base.
FIG. 5 is an enlarged fragmentary sectional view showing the apparatus composed of a locator pin formed integral with the base and positioned in an electrical outlet or switch box.
Figure 6:
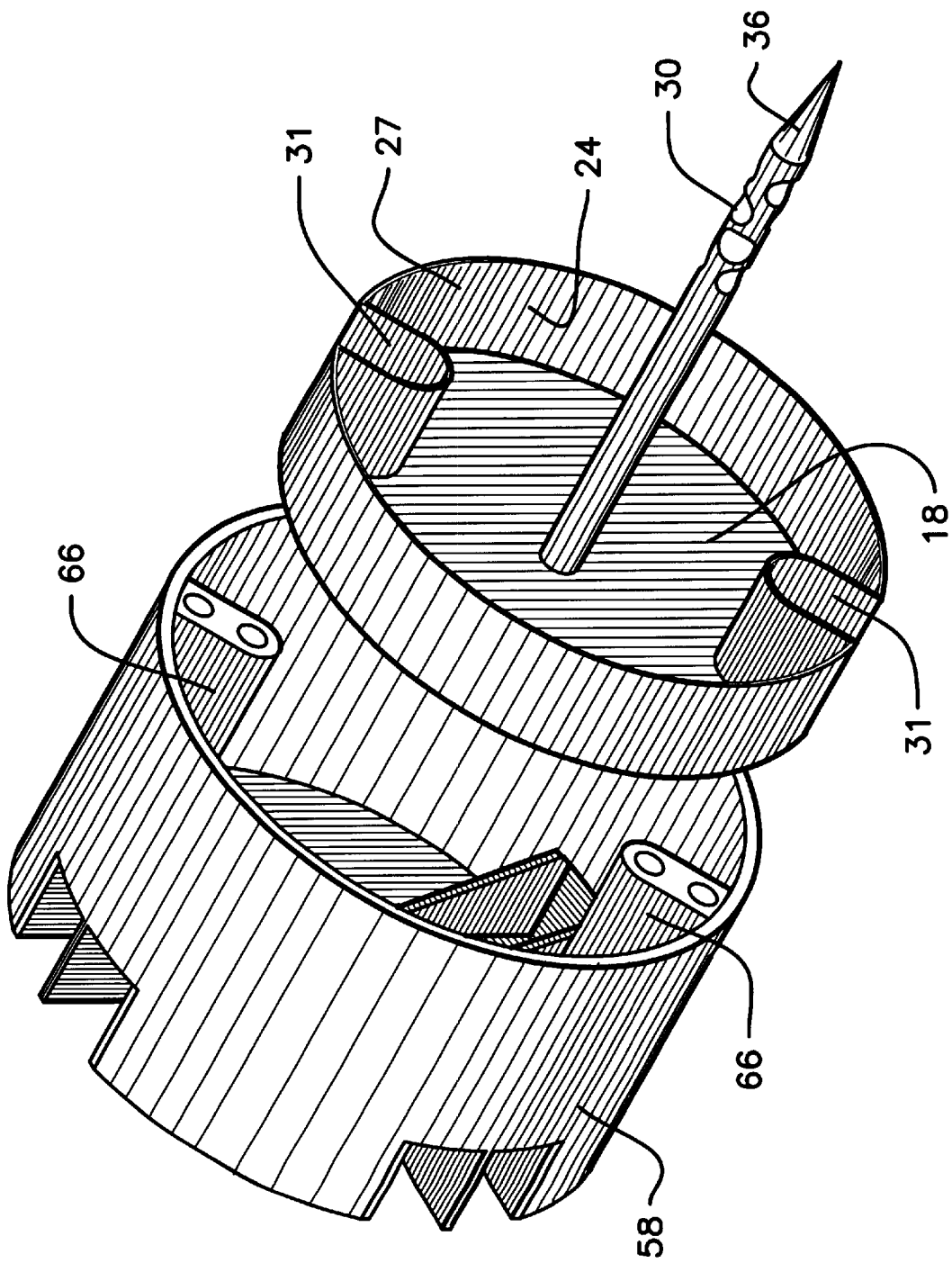
FIG. 6 is an exploded isometric view showing the apparatus comprising a round base to be positioned within a round ceiling box.
Figure 7:
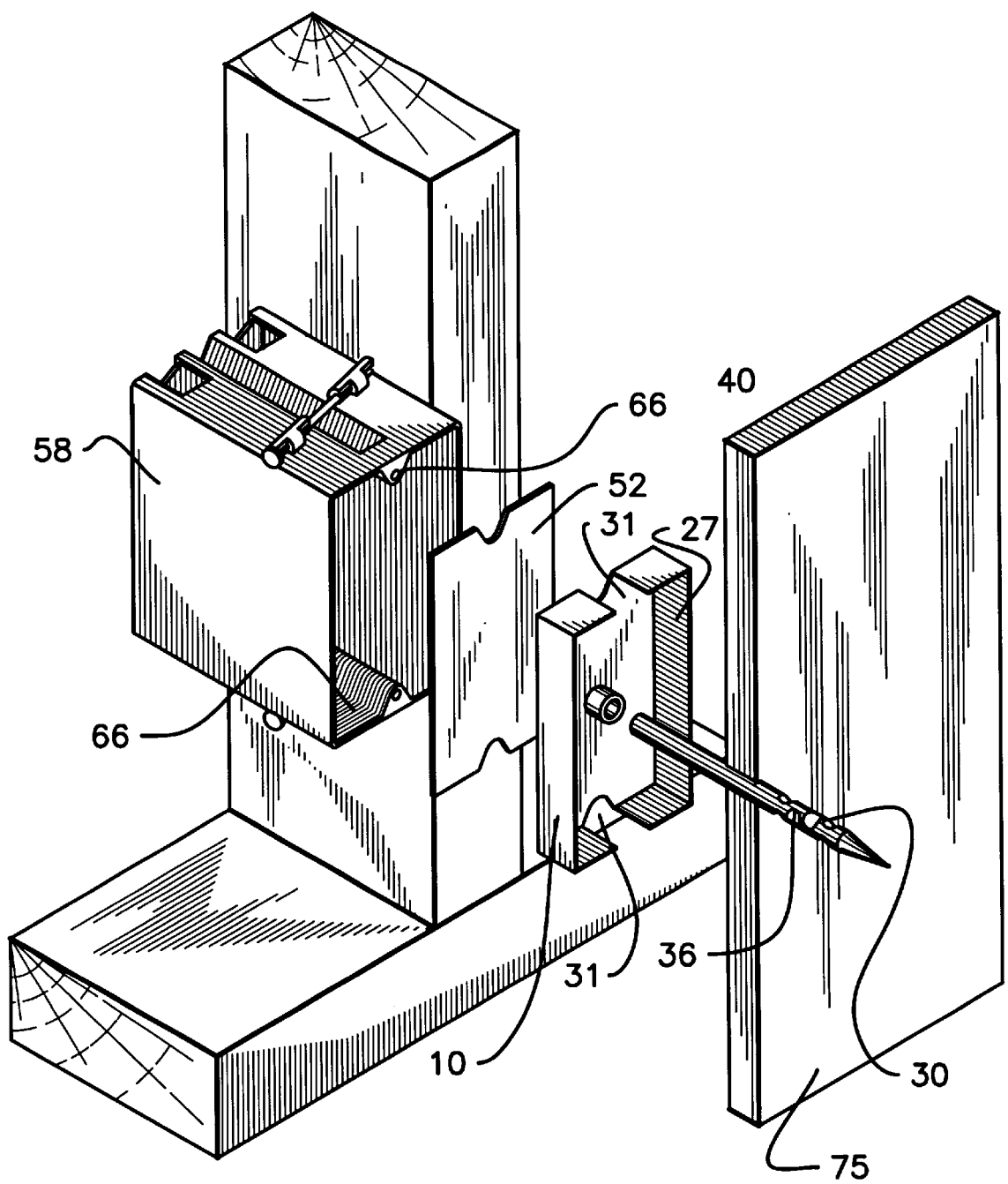
FIGS. 7 and 7A show an exploded isometric view showing the apparatus including a protective sheet, a single gang box attached to a stud, and a panel to be pierced by the locator pin.
Figure 7A:
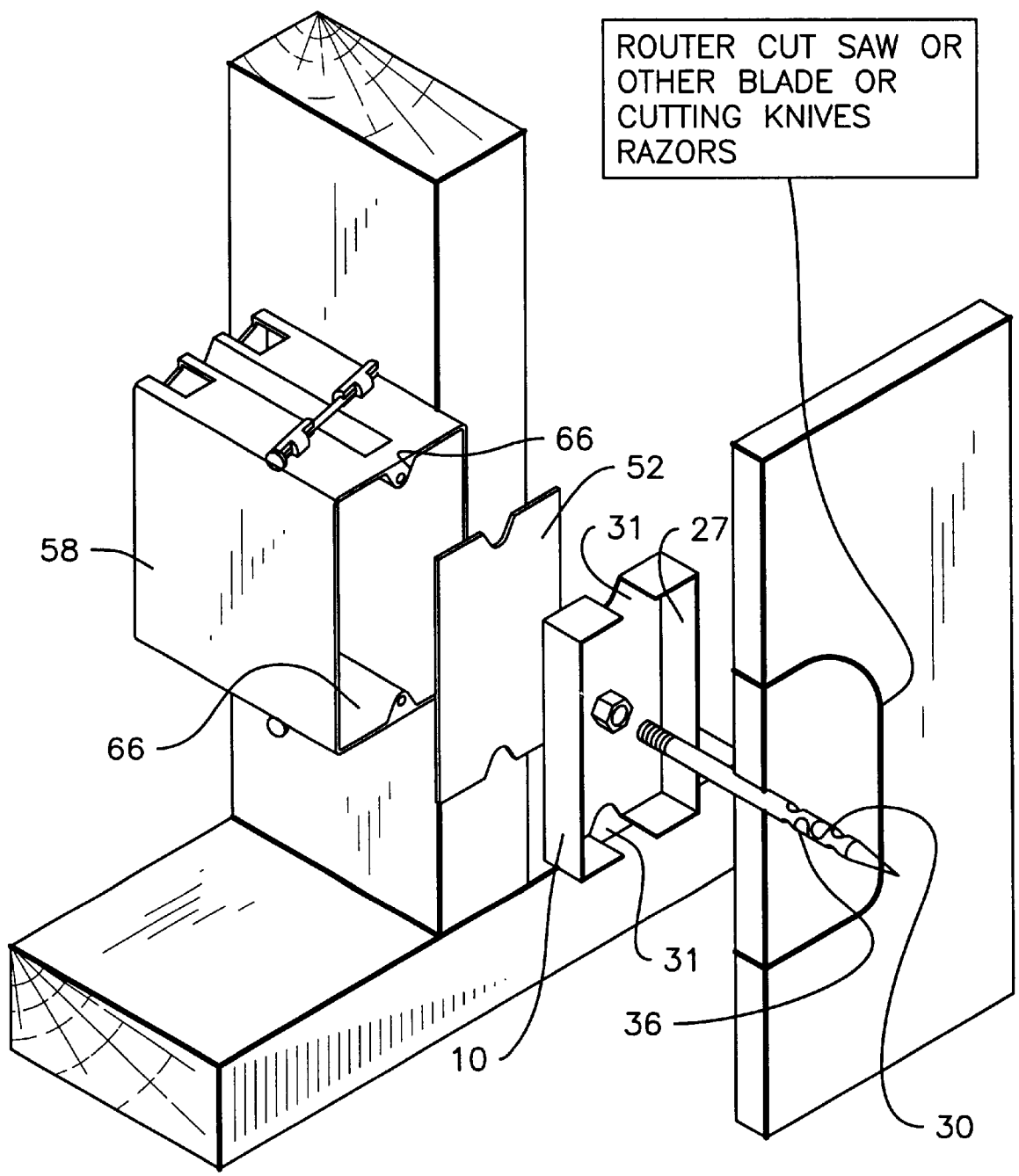
Figure 8:
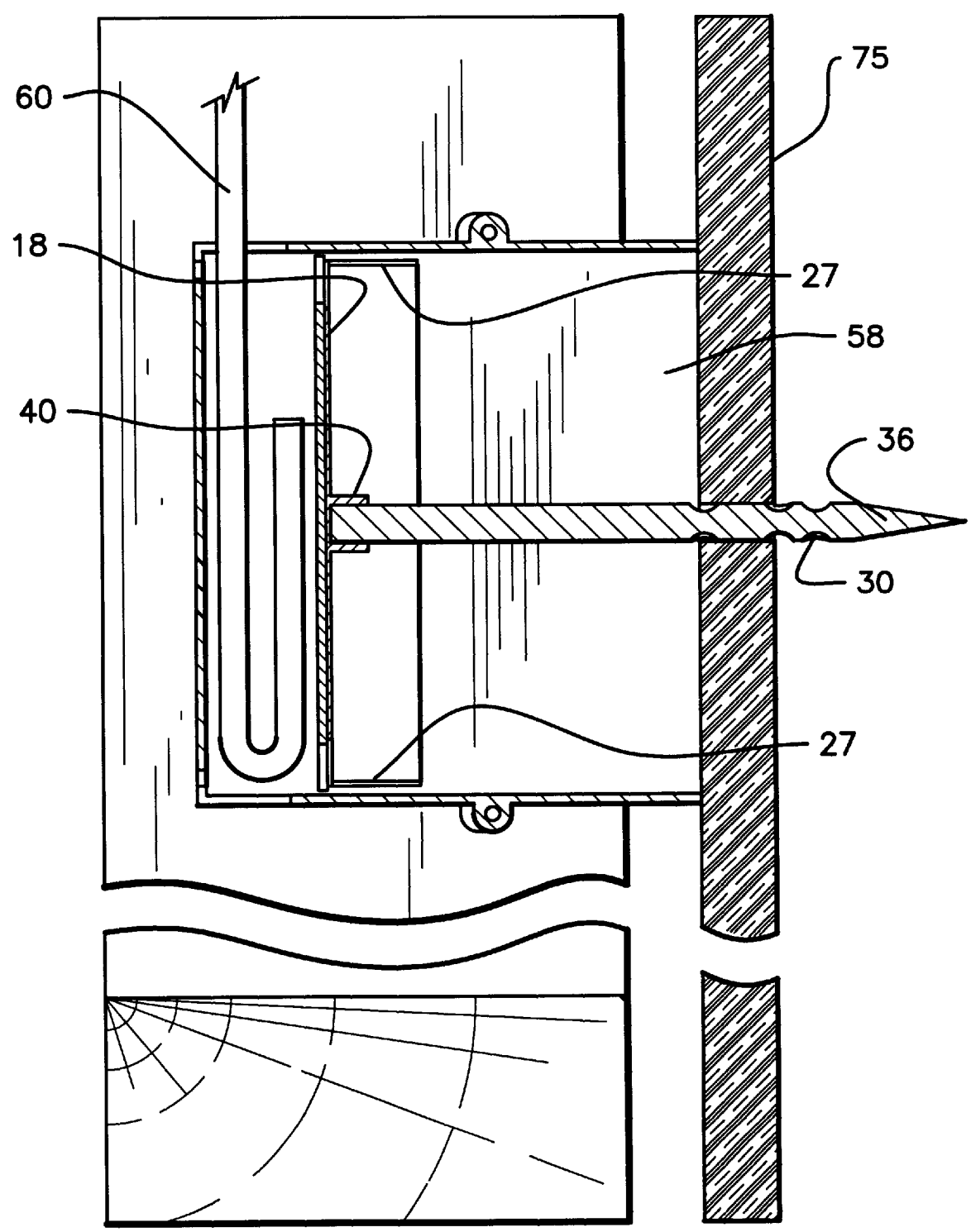
FIG. 8 is a side sectional view showing the apparatus positioned within an electrical outlet or switch box. Also shown is the locator pin protruding through a panel.
Figure 9:
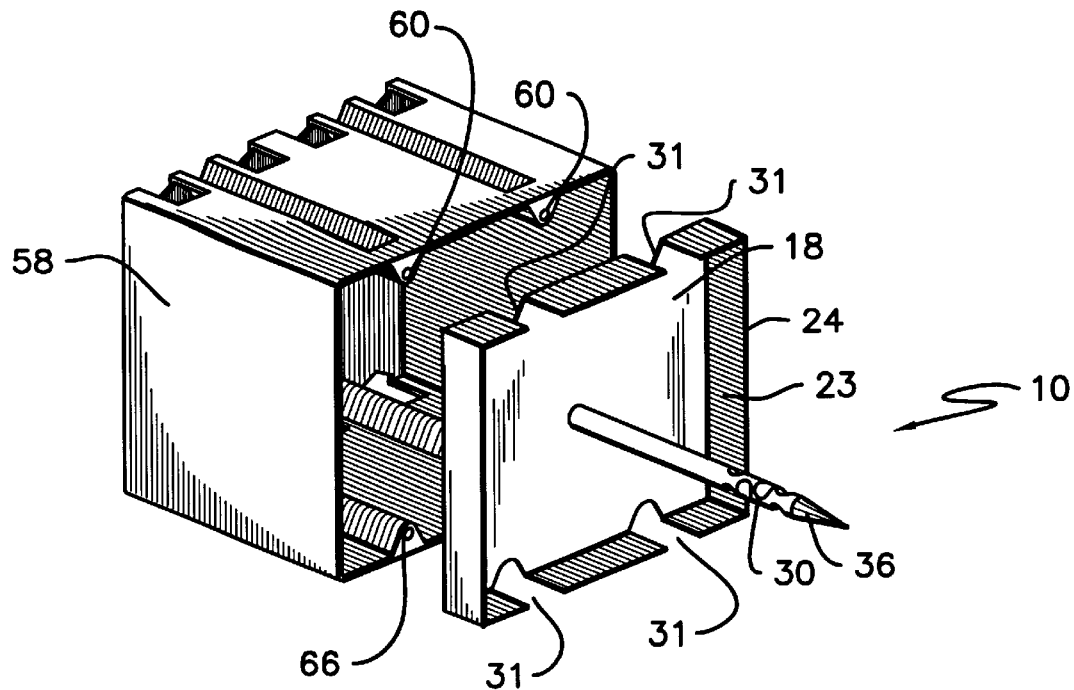
FIG. 9 shows an exploded isometric view of a two gang electrical outlet or switch box and the apparatus to be positioned therein.
Figure 10:
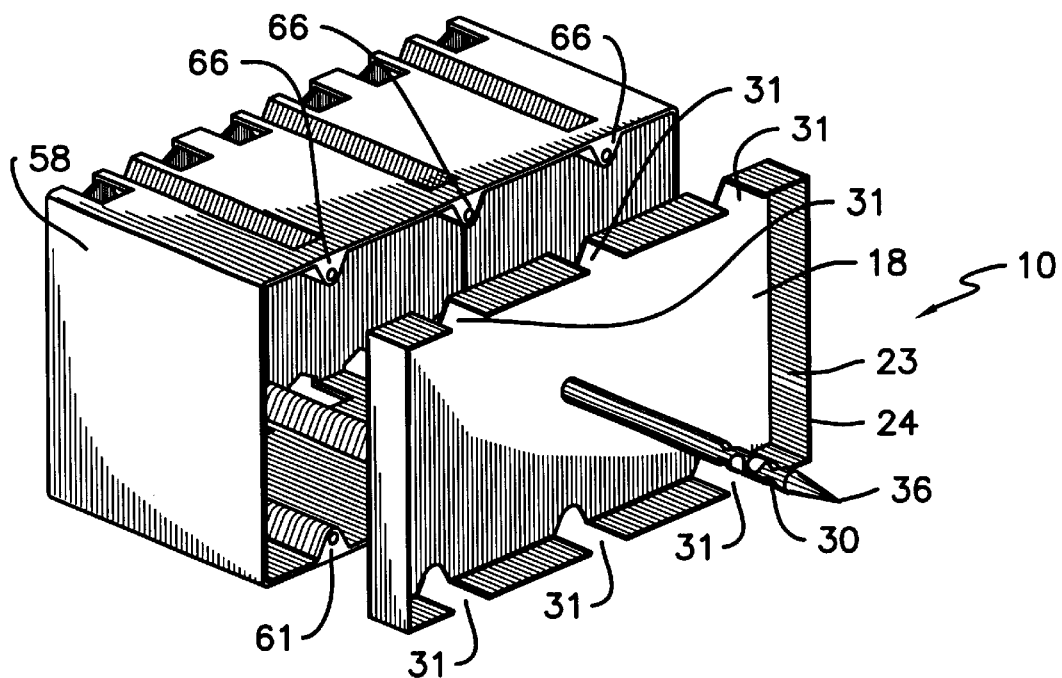
FIG. 10 shows an exploded isometric view of a three gang electrical outlet or switch box and the apparatus to be positioned therein.

The present invention discloses an apparatus for locating the position of an object behind a panel and protecting said object or any contents therein during the cutting of an aperture in the panel. In particular, the present invention discloses an apparatus 10 for locating the position of an electrical outlet or switch box 58 or the like behind a panel 75 and protecting any wires 60 situated in said box 58 during the cutting of an aperture in the panel 75 to reveal said box 58. The box 58 may be of any type, shape, or size, as recognized by one of ordinary skill in the art, including but not limited to single and multi-gang boxes, and round and square boxes. The apparatus 10 comprises a base 18 composed of substantially planar front and back surfaces. The edge 24 of said base 18 may extend a distance generally normal to one of said substantially planar front and back surfaces to thereby define a support extension 27. The support extension 27 supports and stabilizes the apparatus 10 when positioned a box 58. A locator pin 36 is connected to the base 18 by means, and extends outwardly from the base 18 for piercing the panel 75. As shown in FIGS. 4–6, 9–10, the locator pin 36 may be formed integral with the base 18 or, in an alternative embodiment as shown in FIGS. 1–3, the apparatus 10 may further comprise female threads 43 located in said base 18 and male threads 49 located on the locator pin 36 to be received into said female threads 43. In another embodiment as shown in FIGS. 7–8, the apparatus 10 may comprise a aperture 40 to receive and hold the locator pin 36. The locator pin may comprise an abrasive gripping portion 30 formed thereon to facilitate removal of the pin.

The apparatus 10 may further comprise at least one support indentation 31 located on the support extension 27 to receive any mounting receptacles 66 of the box 58. The at least one support indentation is optional and may not be required if the mounting receptacles 66 are not located in the interior of the box 58.

In the preferred embodiment the apparatus 10 may be composed of a rigid plastic material.

In an alternative embodiment the apparatus 10 may be composed of metal. As shown in FIGS. 1–5, and 7, a protective sheet 52 composed of a non-conductive material may be attached to and cover the back surface of said base 18 to thereby prevent electrical conduction to said apparatus 10 from any electrical conductor, such as any wires 60, situated behind said panel. The sheet 52 may be attached using glue, rivets, or any other method or substance as recognized by one of ordinary skill in the art. The non-conductive material may be plastic, wood, or any other non-conductive material as recognized by one of ordinary skill in the art.

The invention further discloses a method of cutting an aperture in a panel 75 to reveal an electrical outlet or switch box 58 or the like located behind said panel 75, comprising the steps of inserting the apparatus 10 into the electrical outlet or switch box 58 such that the locator pin 36 extends a distance out of said box 58; and moving the panel 75 into the desired position, causing the locator pin 36 to protrude through the panel 75, thereby locating the position of the box 58 or the like behind the panel 75 and protecting any contents situated in said box 58, such as any wires 60, during the cutting of the aperture.

Prior to cutting the aperture, the locator pin 36 may be removed, using means, to facilitate the cutting. If the locator pin 36 has male threads 49 received into the female threads 43 on the base 18, the locator pin 36 may either be unscrewed from the base 18 or broken at a point along the locator pin 36. If the locator pin 36 is formed integral with the base 18, the locator pin 36 may be broken at a point along the locator pin 36.

An aperture may be accurately cut in the panel 75 to reveal said box 58 using cutting means. The panel 75 may be cut using any cutting device as recognized by one of ordinary skill in the art including but not limited to knives, razors, and saws. It is preferred that the aperture in said panel 75 is cut using a router.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of cutting an aperture in a panel having a thickness to reveal an electrical outlet or switch box located behind said panel having a thickness, comprising the steps of:
   a. providing an apparatus for locating the position of an object behind the panel and protecting the object or any object contents therein during the cutting of the aperture in the panel, said apparatus for locating comprising:
      a base composed of substantially planar front and back surfaces; a base edge extending a distance in a direction generally normal to one of said substantially planar front and back surfaces to thereby define a support extension; and a locator pin connected by means for connecting to the base and extending outwardly from said base for piercing the panel;
   b. inserting the apparatus into the box such that the locator pin extends out of said box a distance of at least the thickness of the panel;
   c. moving the panel into a desired position, causing the locator pin to protrude through the panel, thereby locating the position of said box behind the panel and protecting said box and any contents therein during the cutting of the aperture;
   d. cutting the aperture in said panel to reveal said box using cutting means;
   e. removing at least the portion of the locator pin protruding through the panel before cutting the aperture in said panel.

2. A method in accordance with claim 1 further comprising:
   a. removing the locator pin before cutting the aperture in said panel.

3. A method in accordance with claim 2 wherein the aperture in said panel is cut using a router.

* * * * *